US011892016B2

(12) United States Patent
Caputo et al.

(10) Patent No.: US 11,892,016 B2
(45) Date of Patent: Feb. 6, 2024

(54) ANCHOR FITTING FOR ANCHORING IN A WORKPIECE

(71) Applicant: Festool GmbH, Wendlingen (DE)

(72) Inventors: Jonathan Caputo, Leonberg (DE); Michael Majer, Notzingen (DE)

(73) Assignee: FESTOOL GMBH, Wendlingen (DE)

( * ) Notice: Subject to any disclaimer, the term of this patent is extended or adjusted under 35 U.S.C. 154(b) by 830 days.

(21) Appl. No.: 16/761,714

(22) PCT Filed: Oct. 30, 2018

(86) PCT No.: PCT/EP2018/079646
§ 371 (c)(1),
(2) Date: May 5, 2020

(87) PCT Pub. No.: WO2019/086415
PCT Pub. Date: May 9, 2019

(65) Prior Publication Data
US 2020/0331106 A1    Oct. 22, 2020

(30) Foreign Application Priority Data
Nov. 6, 2017    (DE) .......................... 102017125877.9

(51) Int. Cl.
*F16B 12/18*    (2006.01)
*F16B 12/20*    (2006.01)

(52) U.S. Cl.
CPC .......... *F16B 12/18* (2013.01); *F16B 12/2063* (2013.01)

(58) Field of Classification Search
CPC .... F16B 5/0088; F16B 5/0092; F16B 5/0216; F16B 12/18; F16B 12/20; F16B 12/2009;
(Continued)

(56) References Cited

U.S. PATENT DOCUMENTS 5,108,215 A    4/1992  Hassid et al.
10,584,732 B2 *  3/2020  Walz ........................ F16B 12/20
(Continued)

FOREIGN PATENT DOCUMENTS

CN    1138891        12/1996
CN    1138891 A      12/1996
(Continued)

*Primary Examiner* — Josh Skroupa
(74) *Attorney, Agent, or Firm* — Hoffmann & Baron, LLP

(57) ABSTRACT

An anchoring fitting for anchoring in a workpiece, wherein the anchoring fitting includes a tie rod to be arranged in a connecting recess of the workpiece and a buttress body to be arranged in a buttress recess of the workpiece communicating with the connecting recess, wherein the buttress body includes an insertion receptacle for inserting an insertion section of the tie rod along an insertion axis and a support surface arrangement for support on the buttress recess of the workpiece, wherein at least one support surface of the support surface arrangement extends, transversely to a longitudinal axis of the tie rod inserted into the insertion receptacle, so that the tie rod is supported with respect to its longitudinal axis on the buttress recess, wherein the anchoring fitting includes a clamping body for clamping the insertion section of the tie rod in the insertion receptacle.

31 Claims, 3 Drawing Sheets

(58) Field of Classification Search
CPC .............. F16B 12/2027; F16B 12/2036; F16B 12/2054; F16B 12/2063; F16B 12/24; F16B 2012/2045; Y10S 403/12; Y10S 403/13
See application file for complete search history.

(56) References Cited

U.S. PATENT DOCUMENTS

| | | | | |
|---|---|---|---|---|
| 10,655,662 | B2 * | 5/2020 | Rovoletto | ............ F16B 12/2027 |
| 10,767,676 | B2 * | 9/2020 | Cattaneo | ............. F16B 12/2063 |
| 10,962,037 | B2 * | 3/2021 | Cattaneo | ............. F16B 12/2063 |

FOREIGN PATENT DOCUMENTS

| | | | | |
|---|---|---|---|---|
| CN | 1207796 | | 2/1999 | |
| CN | 1207796 | A | 2/1999 | |
| CN | 1558992 | | 12/2004 | |
| CN | 1558992 | A | 12/2004 | |
| CN | 102224315 | | 10/2011 | |
| CN | 102224315 | A | 10/2011 | |
| CN | 102232149 | | 11/2011 | |
| CN | 102232149 | A | 11/2011 | |
| CN | 103541968 | | 1/2014 | |
| CN | 103541968 | A | 1/2014 | |
| DE | 9490402 | U1 | 12/1995 | |
| DE | 102006024265 | | 1/2008 | |
| DE | 102006024265 | B3 | 1/2008 | |
| DE | 102009011845 | A1 | 9/2010 | |
| DE | 102011009335 | | 8/2011 | |
| DE | 102011009335 | A1 | 8/2011 | |
| DE | 102015100199 | A1 | 7/2016 | |
| EP | 2609833 | B1 * | 6/2015 | .............. F16B 12/24 |
| EP | 2980423 | A1 * | 2/2016 | ........... F16B 12/2063 |
| FR | 1331299 | A * | 6/1963 | ........... F16B 12/2009 |
| FR | 2151231 | A5 * | 4/1973 | ...... F16B 2012/2045 |
| JP | H09220128 | | 8/1997 | |
| JP | H09220128 | A | 8/1997 | |

* cited by examiner

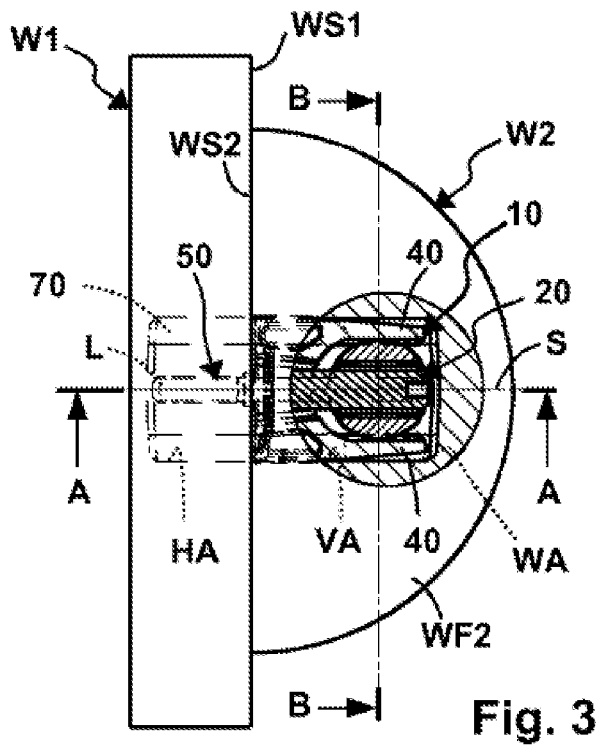
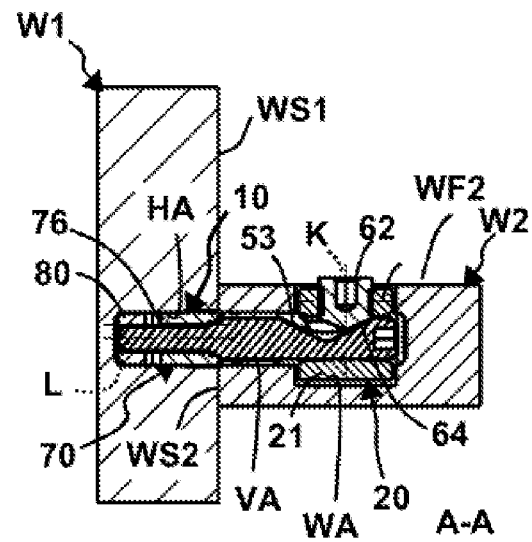
Fig. 3  Fig. 4
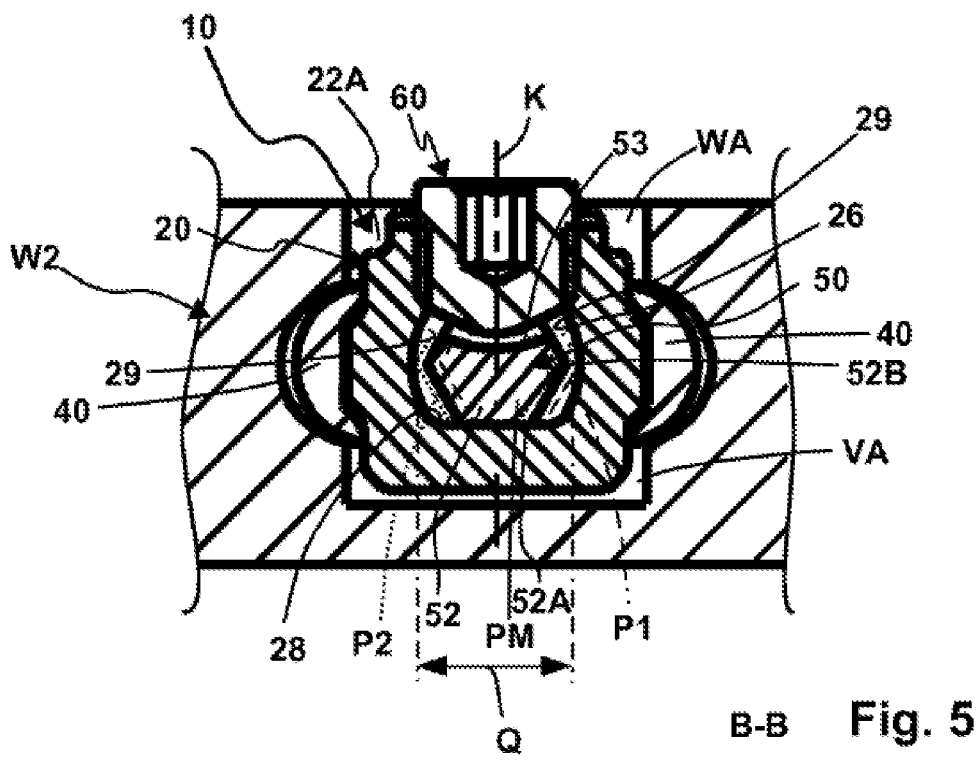
Fig. 5

ANCHOR FITTING FOR ANCHORING IN A WORKPIECE

This application claims priority based on an International Application filed under the Patent Cooperation Treaty, PCT/EP2018/079496, filed Oct. 30, 2018, which claims priority to DE 102017125877.9, filed Nov. 6, 2017.

BACKGROUND OF THE INVENTION

The invention relates to an anchoring fitting for anchoring in a workpiece, wherein the anchoring fitting comprises a tie rod to be arranged in a connecting recess of the workpiece and a buttress body to be arranged in a buttress recess of the workpiece communicating with the connecting recess, wherein the buttress body comprises an insertion receptacle for the insertion of an insertion section of the tie rod along an insertion axis and a support surface arrangement for the support on the buttress recess of the workpiece, wherein at least one support surface of the support surface arrangement extends, in particular approximately perpendicularly, transversely to a longitudinal axis of the tie rod inserted into the insertion receptacle, so that the tie rod is supported with respect to its longitudinal axis on the buttress recess, wherein the anchoring fitting comprises a clamping body for clamping the insertion section of the tie rod in the insertion receptacle, and wherein at least one support body of the anchoring fitting has a flat shape with flat sides opposite to one another and narrow sides, which are rounded in particular, extending between the flat sides for formfitting support, at least in sections, in the connecting recess or the buttress recess of the workpiece.

Such an anchoring fitting is explained, for example, in DE 10 2015 100 199 A1. This anchoring fitting is a connection fitting for connecting two workpieces, for example, furniture pieces. The tie rod is rod-shaped and thus extends along a longitudinal axis and is insertable into the buttress body. The buttress body has a flat shape and is insertable in a twist-locked manner into a corresponding buttress recess. The tie rod is typically housed in a support body, which has a flat shape geometrically corresponding in principle to the shape of the buttress body, so that a fixed, twist-locked, and substantially non-displaceable fitting configuration is provided to be accommodated in the two workpiece recesses, the connecting recess and the buttress recess.

However, it is necessary to work very precisely so that the anchoring fitting or connection fitting actually fits into the workpiece recesses and the counterpart, the other workpiece, is connectable accordingly.

A connection fitting having an anchoring body arrangement and a traction element and also a retaining body is disclosed in DE 10 2009 011 845 A1, which engages with a first and second section on an inner circumference of a first receptacle and a second receptacle of workpieces to be connected to one another.

DE 10 2006 024 265 B3 explains a fitting device for connecting two furniture parts using a clamping means, which comprises a clamping bolt and a clamping element, which is movably mounted for executing a clamping movement in a fitting part of the fitting device, which comprises an insertion receptacle for inserting the clamping bolt.

DE 94 90 402 U1 describes an apparatus having a female and a male part, which comprises an end section having an expanding region to be accommodated in the female part, wherein the expanding region contains multiple cone sections for widening the female part.

SUMMARY OF THE INVENTION

Proceeding therefrom, it is the object of the present invention to provide an improved anchoring fitting.

To achieve the object, it is provided in an anchoring fitting of the type mentioned at the outset that the plug receptacle, transverse to the insertion axis, has an alignment transverse width suitable for aligning the tie rod with respect to the buttress body, which is greater than a movement play necessary for inserting the tie rod into the insertion receptacle.

The movement play is basically the distance between the insertion receptacle and the insertion section of the tie rod, which is basically required for an insertion of the insertion section into the insertion receptacle. The movement play is the clearance between the insertion receptacle and the insertion section of the tie rod which is required to insert the insertion section into the insertion receptacle. A transverse width of the insertion receptacle thus has to be sufficient in any case so that the insertion section of the tie rod is insertable into the insertion receptacle.

It is a basic concept of the present invention that the tie rod is insertable in a manner known per se into the buttress body, but has a certain movement play therein which is greater than a movement play necessary for the insertion of the tie rod into the insertion receptacle. The tie rod is alignable in the insertion receptacle, so that possibly inexactly arranged workpiece recesses, for example, drilled holes to form the connecting recess and/or the buttress recess, are not important. However, they are also not as important as is the case in the prior art for an alignment of two workpieces, namely of the workpiece which accommodates the anchoring fitting and a workpiece which is to be fastened using the anchoring fitting on the first workpiece.

The at least one support surface of the support surface arrangement extends transversely to a longitudinal axis of the tie rod inserted into the insertion receptacle, for example, perpendicularly or approximately perpendicularly, in particular at an angle of approximately 80°-100°, preferably 85°-95°.

The alignment transverse width is preferably at least 5%, preferably approximately 10%, or still more preferably approximately 20-30% greater than a transverse width of the insertion section of the tie rod. A clear width of the insertion receptacle is therefore sufficiently large that the tie rod remains adjustable with its insertion section transversely in relation to its longitudinal axis in a broad range.

The insertion receptacle advantageously comprises a transverse height which is angled, in particularly perpendicularly, with respect to the longitudinal axis of the tie rod, transversely, in particular perpendicularly transversely, to its alignment transverse width. The transverse height is advantageously less than the height of the insertion section of the tie rod, which more or less fills up the transverse height or extends within the transverse height, than the alignment transverse width in relation to a transverse width of the insertion section of the tie rod. The transverse height advantageously comprises a movement play sufficient for the insertion of the tie rod into the insertion receptacle. The movement play is advantageously approximately 1 to 5% of a height of the insertion section of the tie rod. The transverse height extends, for example, between a base surface and a support surface opposite to the base surface or a pair of support surfaces opposite to the base surface of the insertion receptacle.

One or more components of the anchoring fitting advantageously consist of metal, in particular the buttress body and the tie rod and also advantageously the clamping body. However, it is also possible that one or more components of the anchoring fitting consist of plastic, in particular of a polyamide material or the like.

The clamping body is advantageously adjustable with respect to the buttress body along a clamping axis, wherein the alignment transverse width extends transversely to the clamping axis. The clamping axis and the longitudinal axis of the tie rod, when it is inserted into the insertion receptacle, preferably extend perpendicularly or in any case transversely in relation to one another. Therefore, the insertion axis, the clamping axis, and the longitudinal axis of the transverse width or the transverse width thus advantageously extend perpendicularly to one another. However, an oblique arrangement would also be possible, i.e., for example, the clamping axis extends obliquely in relation to the insertion axis. Furthermore, it is conceivable that the clamping is performed not only using one clamping body but rather using multiple clamping bodies.

The clamping body is advantageously opposite to a base surface of the insertion receptacle. The clamping body is therefore adjusted toward the base surface when it is supposed to assume its clamped position clamping the tie rod in the insertion receptacle.

The insertion receptacle advantageously comprises a base surface provided for accommodating the insertion section of the tie rod. The base surface more or less forms the buttress the counter pressure surface for the clamping body.

The base surface and/or a contact of the insertion section of the tie rod for contact on the base surface are advantageously planar surfaces or flat surfaces. In particular, it is advantageous if a contact of the insertion section of the tie rod and the base surface abut one another flatly and/or in a tilt-proof manner. However, it is also possible that the tie rod comprises, for example, a concave contact surface, which can rest on a corresponding convex base surface or also, however, a planar or flat base surface of the insertion receptacle.

The clamping body advantageously comprises a clamping inclination, for example, a clamping cone, on its side facing toward the insertion section of the tie rod, for example, its front side.

The clamping body advantageously comprises a clamping screw or is formed by a clamping screw. It is also possible that the clamping body is not necessarily a clamping screw, but rather another body which comprises a screw section to be screwed into the buttress body, however. A screw drilled hole or screw passage opening is advantageously provided on the buttress body, which extends at an angle, in particular transversely or perpendicularly, to the insertion axis of the insertion receptacle.

It is furthermore advantageous if the insertion receptacle is wider than the base surface in a region between the clamping body and the base surface to provide the alignment transverse width. The insertion receptacle thus has a comparatively narrow base surface, but one bulge or multiple bulges above the base surface or in a region between the base surface and the clamping body.

The insertion receptacle advantageously extends obliquely outward from the base surface, for example, curved, linearly, or the like. The insertion receptacle therefore comprises side wall surfaces extending obliquely outward, in particular curved, from the base surface. It is possible that the insertion receptacle comprises such a curved or obliquely extending side wall surface on only one side, while the opposing side wall surface can be inclined or perpendicular to the base surface inward toward the base surface, for example.

The insertion section of the tie rod advantageously comprises a contact surface for contact on a base surface of the insertion receptacle and also at least one projection protruding in a plane parallel to the contact surface, which protrudes in front of the contact surface in the direction of the alignment transverse width. The tie rod is therefore narrower in the region of the contact surface than in the region of the at least one projection. The at least one projection can be formed, for example, by an actuating contour for an assembly tool, for example, an outer edge surface. It is to be noted here that the insertion section can be formed as a whole as a polygon, for example, a quadrilateral, pentagon, hexagon, or octagon. One of the surfaces between the edges forms the contact surface in this case.

The support surface arrangement of the buttress body advantageously comprises at least two support surfaces, which are provided on opposing sides and are provided for the support transversely, for example, approximately perpendicularly transversely, to the longitudinal axis of the tie rod on the buttress recess. The support surfaces therefore extend transversely to the longitudinal axis of the tie rod. The support surfaces can be linear support surfaces or flat support surfaces. The support surfaces preferably comprise a curvature.

The support surface arrangement of the buttress body advantageously comprises at least one support rib and/or a rib structure for engaging in the workpiece in the region of the buttress recess. The support ribs or the at least one support rib can penetrate, for example, into the workpiece, in particular a wooden workpiece, and implement a type of twist lock therein.

Furthermore, it is advantageous if the at least one support body comprises a buttress body receptacle for the buttress body, in which the buttress body engages in the assembled state of the anchoring fitting. It is to be noted here that the buttress body can form the support body, i.e., for example, the buttress body itself has a flat shape having opposing flat sides and narrow sides, which are round or linear, for example, extending between the flat sides.

In addition, it is to be noted that the flat sides are wider than the narrow sides transversely to the longitudinal axis of the support body, for example, twice as wide or three times as wide.

If the support body is a separate body from the buttress body, in one advantageous design, it has the above-mentioned buttress body receptacle. The buttress body receptacle can be, for example, a passage opening, through which the buttress body is insertable. It is furthermore possible that the buttress body receptacle is a type of pocket hole or blind hole, into which the buttress body is insertable.

An embodiment is preferred in which the buttress body receptacles are provided between forked protruding arms of the support body. The narrow sides are advantageously provided on the arms of the support body. In particular, the arms of the support body are rounded on the outer side, i.e., facing away from the buttress body receptacle.

A linear guide, for example, a guide groove or a guide projection is advantageously provided, for example, on at least one arm, however, also two arms of the support body for the insertion of the buttress body into the buttress body receptacle. Guide contours matching with the linear guide are provided on the buttress body itself, for example, a guide projection for engaging in a guide groove or a guide receptacle for engaging or for receiving a guide projection of the arm. Thus, for example, the support body can be inserted transversely to its insertion axis, using which the buttress body is insertable into the buttress recess of the workpiece, of the buttress body already arranged in the buttress recess.

Twist-lock contours, for example, polygonal twist-lock contours, are advantageously provided on the buttress body receptacle and/or on the buttress body for the twistlocked accommodation of the buttress body in the buttress body receptacle. The buttress body, when it is located in the buttress body receptacle of the support body, thus cannot twist. This facilitates the actuation of the clamping body, for example.

The buttress body receptacle is advantageously arranged on at least one flat side or extends between the flat sides of the support body the buttress body can therefore be inserted into the support body or inserted through the support body from one of the flat sides thereof.

It is to be noted here that the buttress body advantageously protrudes in front of the support body on at least one side, in particular a flat side of the support body. Furthermore, it is advantageous if the buttress body protrudes in front of the support body on opposing sides, in particular flat sides of the support body.

Furthermore, it is advantageous if the support body comprises a passage opening for the tie rod. The passage opening advantageously comprises a transverse width enabling an alignment of the tie rod in the insertion receptacle at least in the region of the buttress body. The transverse width can be somewhat less than the alignment transverse width. However, it is advantageous if the transverse width of the passage opening for the tie rod is greater than the alignment transverse width of the insertion receptacle of the buttress body.

The at least one support body is advantageously provided or designed to be arranged in the connecting recess. The support body advantageously comprises a flat front side. The flat front side can align, for example, with an outer contour of the workpiece when the support body is inserted into the connecting recess and the anchoring fitting is completely assembled.

The tie rod advantageously comprises at least one rotary driving contour, for example, a hexagonal contour or another polygonal contour, for an assembly tool. The rotary driving contour is suitable, for example, for a hex wrench. For example, the rotary driving contour can be an inner contour. The rotary driving contour preferably comprises an external circumferential contour of the tie rod. The assembly tool, for example, a hex wrench, an assembly socket, an assembly wrench, or the like can be engaged with the rotary driving contour.

Preferably, as stated, the or one rotary driving contour is arranged on an outer circumference of the tie rod. Furthermore, it is preferable if the rotary driving contour is arranged in the region of the insertion section. For example, a hexagon socket or another rotary driving contour is provided on an end side of the longitudinal end on which the insertion section is arranged or provided. The rotary driving contour can also completely form the insertion section or the insertion section can be completely formed as a rotary driving contour on its outer circumference, except for the positioning inclinations or clamping inclinations or adjustment inclinations explained hereafter. The rotary driving contour can be provided, for example, for an at least partially twist-locked application of the insertion section in the insertion receptacle of the buttress body.

One advantageous exemplary embodiment provides that the at least one rotary driving contour is provided on a head or an end side, in particular on the end side on a head, of the tie rod.

An actuation recess for the at least one rotary driving contour is advantageously provided on the insertion receptacle of the buttress body for the tie rod. The tie rod is actuatable through the actuating recess, preferably on its end side and/or from its end side, for example, in the region of the rotary driving contour, when it is accommodated in the insertion receptacle.

The insertion receptacle of the buttress body for the tie rod is advantageously designed as a passage opening. The passage opening enables, for example, an actuation of the above-explained rotary driving contour.

The tie rod advantageously comprises a screw section, for example for screwing into an anchoring body. The screw section and the insertion section, which is to be inserted into the insertion receptacle of the buttress body, are provided on longitudinal end regions of the tie rod opposing one another. Therefore, one longitudinal end of the tie rod is provided for insertion into the buttress body, the other longitudinal end is provided for connection to a further body, for example, an anchoring body, of the anchoring fitting. However, the screw section can also be provided to be screwed into another workpiece. The screw section can comprise, for example, a self-tapping thread, which can be screwed directly into a workpiece, in particular a wooden workpiece. An inclined surface arrangement is preferably provided between the tie rod and the clamping body for the longitudinal adjustment of the tie rod with respect to the buttress body in the direction of the longitudinal axis of the tie rod. The inclined surface arrangement can comprise, for example, the above-mentioned clamping inclination, in particular the clamping cone, on the clamping body or can be formed thereby.

The inclined surface arrangement advantageously comprises at least one positioning inclination extending obliquely to the longitudinal axis of the tie rod, which is provided in particular on the tie rod itself, but can also be provided on the clamping body. It is to be noted at this point that the corresponding positioning inclinations or inclined surfaces can be provided on both, namely the tie rod and the clamping body. The at least one positioning inclination can comprise multiple, for example, two or three positioning inclinations extending at an angle to one another in the sense of a depression or a projection.

It is to be noted at this point that a positioning inclination arranged on the tie rod can be longer than a positioning inclination arranged on the clamping body.

The inclined surface arrangement advantageously extends transversely to the longitudinal axis of the tie rod with a transverse width which enables an alignment of the tie rod with respect to the buttress body in the region of the alignment transverse width of the insertion receptacle. A positioning inclination is therefore not narrow along the longitudinal axis of the tie rod, but rather comparatively wide. The tie rod can thus be aligned within the insertion receptacle, wherein the engagement of the clamping body in the positioning inclination of the tie rod is always maintained.

An arrangement is preferred at this point in which an inclined surface on the tie rod is only inclined at an angle to the longitudinal axis of the tie rod, but not transversely to the longitudinal axis of the tie rod. However, it is also possible that the positioning inclination or inclined surface arrangement comprises at least one type of hollow, which comprises two-dimensionally extending inclined surfaces, for example, a conical drilled hole. Such a drilled hole may be produced easily. Nonetheless, with a corresponding flat inclination transversely to the longitudinal axis of the tie rod, it enables the tie rod to remain alignable within the insertion receptacle in the region of the alignment transverse width.

One preferred concept provides that the tie rod is fixable in a formfitting manner in the insertion receptacle with respect to the insertion receptacle by the clamping body in the direction of the longitudinal axis of the tie rod or of the insertion axis of the insertion section. Furthermore, it is advantageous if the tie rod is fixable in a friction-locked manner by the clamping body transversely to the longitudinal axis of the tie rod with respect to the insertion receptacle or transversely with respect to the insertion axis of the insertion section with respect to the insertion receptacle. The tie rod can additionally be supported, for example, transversely to its longitudinal axis by friction-locked application to the connecting recess.

The buttress body is advantageously provided for anchoring the anchoring fitting in a first workpiece. The anchoring fitting additionally also comprises at least one retaining body, for example, the above-mentioned anchoring body, into which the tie rod can be screwed, for fastening in a retaining recess of a second workpiece. The retaining body is connected, for example, permanently connected, to the tie rod. The retaining body can also, however, be detachably connectable to the tie rod on the basis of fastening means. The fastening means comprise, for example, screw means and/or are formed by a screw connection. It is furthermore possible that the retaining body comprises a passage opening for at least one portion of the tie rod. The tie rod can thus be inserted through the passage opening, for example, with a screw section, and connected to a further component, for example, a further tie rod.

The retaining body advantageously has a flat shape having opposing flat sides and narrow sides, which are rounded, for example, extending between the flat sides for formfitting support at least in sections in the retaining recess. The retaining body advantageously comprises an envelope of an outer contour which corresponds to the envelope of the outer contour of the at least one support body of the above-explained basic anchoring fitting. It is to be noted here that the anchoring fitting advantageously comprises those components which are insertable into circular workpiece recesses and otherwise, except for the tie rod, comprises bodies which have the above-mentioned flat shape. The outer circumference geometries of the bodies comprising flat sides are advantageously identical, so that all flat-shaped recesses in the workpiece are producible using a single drilling tool or a single setting of a drilling tool/milling tool.

However, the retaining body can also be in multiple parts, for example, two parts. An arrangement in which the retaining body is insertable from two opposing sides into a retaining recess on a workpiece is preferred. A respective tie rod can be retained, in particular detachably retained, on the respective retaining body or retaining body part.

The retaining body advantageously comprises a clamping body for clamping in the retaining recess of the second workpiece or forms such a clamping body. The retaining body can thus be fastened with solid hold in the retaining recess.

The retaining body advantageously comprises at least one clamping arm for clamping in the retaining recess of the second workpiece. Two clamping arms or a pair of clamping arms which are arranged on an opposing side and are to be clamped like splay feet in the retaining recess are particularly preferred. The at least one clamping arm or the pair of the clamping arms is advantageously adjustable by the tie rod itself or by a wedge body actuatable by the tie rod into a clamped position clamping the retaining body in the retaining recess. The tie rod is advantageously insertable through a passage opening of the retaining body and is connectable, for example, can be screwed, together with the clamping body. When the tie rod is screwed on, for example, on the basis of the above-mentioned rotary driving contours, it adjusts the wedge body between a main body of the retaining body and the clamping arm or the two clamping arms in such a way that the at least one clamping arm or the clamping arms are more or less spread away from the main body of the retaining body in order to clamp the retaining body in the retaining recess.

It is furthermore advantageous if the tie rod forms a first tie rod and the buttress body forms a first buttress body and the anchoring fitting in this configuration comprises a second tie rod and a second buttress body to be arranged in a second workpiece. The first tie rod and the second tie rod are detachably connectable to one another at the longitudinal end regions thereof remote from the respective buttress body, for example, they can be screwed, clamped, or connected in another manner. Such an anchoring fitting can thus be used to connect two workpieces to one another.

One preferred concept provides that a maximum outer circumference and/or an envelope of the buttress body around its insertion axis provided for insertion into the buttress recess is approximately circular. The buttress body does not have to be completely circular, but rather only in its envelope. This is because it is then possible that the buttress body is insertable into the buttress recess if this recess comprises a circular inner contour. The buttress recess is therefore preferably a drilled hole, while the connecting recess advantageously has a flat shape, i.e., a lesser height than width.

BRIEF DESCRIPTION OF THE DRAWINGS

Exemplary embodiments of the invention are explained in greater detail hereafter on the basis of the drawing. In the figures:

FIG. 1 shows an exploded illustration of an anchoring fitting, which

FIG. 3 shows the anchoring fitting according to FIGS. 1, 2 in the assembled state, in which it connects two workpieces to one another and wherein a cutout is shown in the one workpiece, FIG. 4 shows the arrangement according to FIG. 3, approximately along a section line A-A, FIG. 5 shows the arrangement according to FIG. 3, approximately along a section line B-B.

DETAILED DESCRIPTION

Figure 1:
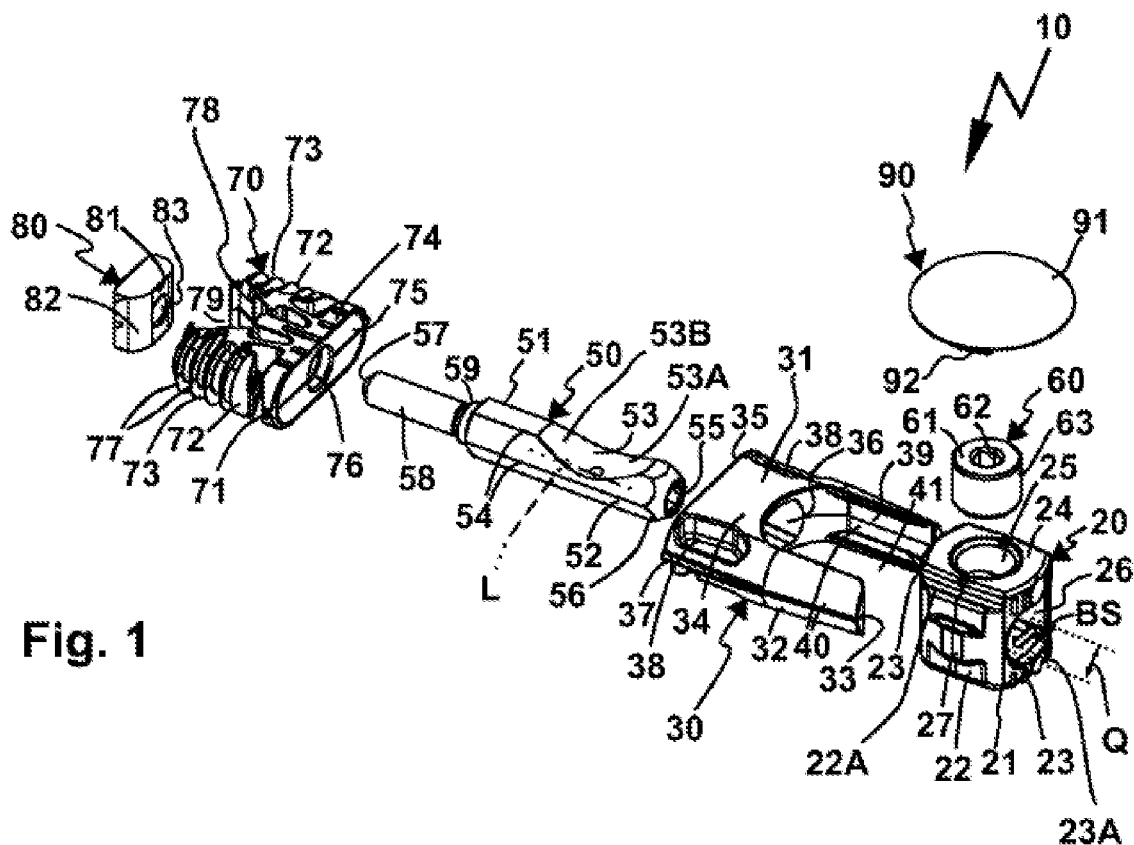
Figure 2:
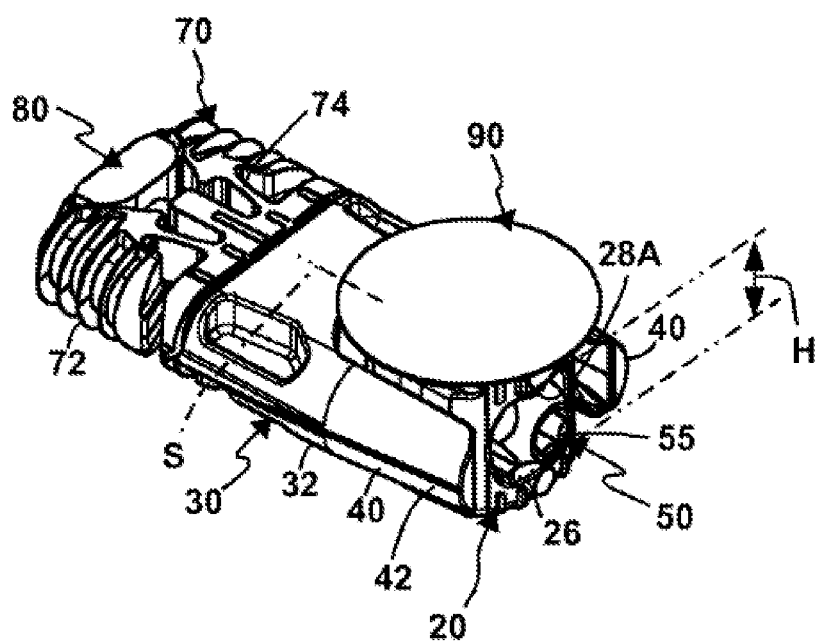
FIG. 2 is illustrated in the assembled state.

An anchoring fitting 10 illustrated in FIGS. 1 and 2 can be anchored in a workpiece W2 and is used to connect the workpiece W2 to a workpiece W1. The workpieces W1 and W2 are, for example, wooden workpieces, wooden slabs, or the like. Of course, the anchoring fitting is also suitable for workpieces made of other materials, for example, plastic or metal. In the state connected to one another, the workpieces W1 and W2 abut one another with the workpiece end sides WS1 and WS2 thereof.

A retaining recess HA is arranged in the workpiece W1 and a connecting recess VA is arranged in the workpiece W2, which are aligned with one another in the assembled state of the anchoring fitting 10 and/or the state of the workpieces W1 and W2 assembled with one another, see, for example, FIGS. 3 and 4. A buttress recess WA is provided in the workpiece W2 transversely in relation to the two recesses VA and HA, for example, perpendicularly transversely. The buttress recess WA extends from a workpiece flat side WF2 of the workpiece W2 into its core region and communicates with the connecting recess VA, which extends perpendicularly or in any case transversely to the buttress recess WA.

A buttress body 20, which is formed, for example, like a retaining socket or the like, is provided for anchoring the anchoring fitting 10 in the workpiece W2. The buttress body 20 has a flat shape on opposing end sides 21 and 24, while front and rear front sides 23 extending between the end sides 21, 24 comprise a rounding. Longitudinal sides 22, which have a substantially flattened shape, extend between the front sides 23, i.e., they are set back on the buttress body 20 in relation to a round or circular envelope of the buttress body 20 in a view from the end sides 21 or 24. However, guide projections 27, which comprise a rounded outer circumferential contour, are provided on the long sides 22. In the plane of the guide projections 27, the buttress body 20 has an approximately circular outer circumferential contour except for support ribs 23A, which are used for the support on the inner circumference of the buttress recess WA.

Because of its approximately circular outer circumferential contour with respect to an insertion axis SW, along which it is insertable into the buttress recess WA, the buttress body 20 can be inserted into the also circular buttress recess WA. An envelope of the buttress body 20 with respect to the insertion axis SW is approximately circular.

A configuration would also be conceivable in which the buttress body 20 is supported directly and/or exclusively on the buttress recess WA, which is not presently the case, however.

Rather, the buttress body 20 is at least additionally supported due to a support body 30, which is provided and shaped for engagement and/or insertion into the connecting recess VA. In particular, the support body 30 has a flat shape having narrow sides 32 and flat sides 34 extending between the narrow sides 32.

The support body 30 comprises a main body 31, from which arms 40 protrude. The flat side 34 is more or less omitted or interrupted in the region of the arms 40, because a buttress body receptacle 41 for the buttress body 20 is located there.

The narrow sides 32 of the support body 30 are rounded on the outer side, i.e., they extend convexly with respect to the flat sides 34. Such a rounding can be continuous, for example, as in particular in the region of insertion inclinations 42 on the arms 40. However, it is also possible that the roundings are not continuous so that, for example, depressions 38 are provided in the region of the narrow sides 32 on the main body 31. However, the outer circumferential contour of the narrow sides 32 is also substantially round in the region of the main body 31.

End sides or front sides 33 of the arms 40 extend up to the buttress recess WA, where the buttress body 20 is arranged in the assembled state of the anchoring fitting 10. The support body 30 can be inserted into the connecting recess VA when the buttress body 20 is already arranged in the buttress recess WA. It acts to facilitate the insertion movement if the guide projections 27 of the buttress body 20 engage in a linear guide 39 of the support body 30. The linear guide 39 is formed, for example, by guide grooves or guide depressions on the arms 40, in which the guide projections or guide contours 27 of the buttress body 20 can engage.

Support ribs 37, which protrude from the narrow sides 32 in a plane approximately parallel to the flat sides 34 and can more or less dig into the material of the workpiece W2, ensure an improved hold of the support body 30 in the connecting recess VA.

The arms 40 comprise the insertion inclinations 42 on the sides thereof facing away from the buttress body receptacle 41, i.e., the arms 40 are narrower and/or tapering toward the free end regions or end sides 33 thereof. An outer circumferential contour of the support body 30 is smaller in the region of the arms 40 than in the region of the main body 31. The support body 30 can thus be inserted more easily into the connecting recess VA, specifically because it is narrower in the region of the end sides 33 than in the region of the end side 34.

An end side 35 of the support body 30 facing away from the buttress body 20 or the buttress body receptacle 41 advantageously aligns in the state of the support body 30 assembled on the workpiece W2 with the workpiece end side WS2 or is set back behind the workpiece end side WS2, i.e., is accommodated depressed in the connecting recess VA.

If the buttress body 20 is now arranged in the buttress recess WA and the support body 30 is arranged in the connecting recess VA, the tie rod 50 can be inserted through the passage opening 36 of the support body 30 up to an insertion receptacle 26 of the buttress body 20 along an insertion axis S and can be clamped by means of a clamping body 60 in the insertion receptacle 26.

The clamping body 60 is accommodated in a clamping body receptacle 25 of the buttress body 20. A rotary driving contour 62, for example, for a hex wrench, is provided on an end side 61 of the clamping body 60. The clamping body 60 is rotationally actuatable by means of the rotary driving contour 62, so that it can be screwed into the clamping body receptacle 25 or unscrewed therefrom. Screw contours or screw threads, which are engaged with screw contours on the inner circumference of the clamping body receptacle 25 are located on an outer circumference 63 of the clamping body 60, which is essentially designed as a screw or clamping screw. A clamping inclination 64, in particular a cone, using which the tie rod 50 can be clamped in the insertion receptacle 26, is provided on an end side of the clamping body 60 opposite to the end side 61, namely on an end side protruding into the insertion receptacle 26.

The tie rod 50 comprises a tie rod body 51. The tie rod 50 extends along a longitudinal axis L or comprises a longitudinal axis L. An insertion section 52 for insertion into the insertion receptacle 26 of the buttress body 20 is provided on one longitudinal end region of the tie rod 50. A screw section 58 is provided on the other longitudinal end region. A step 59 is provided between the screw section 58 and the insertion section 52.

Rotary driving contours 54, 55, using which the tie rod 50 is rotationally actuatable around an axis of rotation and/or its longitudinal axis L, are provided on the tie rod 50. The rotary driving contour 54 is provided on an outer circumference of the tie rod 50, in particular in the insertion section 52.

The rotary driving contour 55 is more or less an inner contour, which is specifically provided at the longitudinal end of the insertion section 52.

An inclined surface arrangement 53 for the clamping body 60 is provided between longitudinal ends 56, 57 of the tie rod 50, but on the insertion section 52. The inclined surface arrangement 53 comprises positioning inclinations 53A, 53B, which extend toward one another in the manner of a hollow or a V-shaped configuration. A depression or a lowest point is more or less provided between the positioning inclinations 53.

When the clamping body 60 is thus screwed along the clamping axis K so that it becomes engaged with the tie rod 50 and assumes a clamped position, the clamping inclination 64 slides along one of the positioning inclinations 53, so that the tie rod 50 is actually adjusted along its longitudinal axis L or the insertion axis S, namely toward the buttress body 20. This clamping movement is used to clamp the workpiece W2 with the workpiece W1, as will be made clearer hereafter:

Specifically, the tie rod 50 is detachably connectable to the retaining body 70. The retaining body 70 is provided for insertion into the retaining receptacle HA of the workpiece W1. The retaining body 70 comprises a main body 71, from which clamping arms 73 protrude in a forked manner. An actuating recess 79, in which a wedge body 80 engages, is provided between the clamping arms 73. The tie rod 50 is connectable to the wedge body 80, namely can be screwed thereon. The screw connection 58 can be screwed, for example, into a screw receptacle 83 on an end side 81 of the wedge body 80. Actuating inclinations 82, which can slide along the inclined surfaces 78 or inner sides of the actuating recess 79, are located laterally adjacent to the screw receptacle 83, so that they spread the clamping arms 73 outward, whereby they come into clamping contact with the narrow sides or narrow inner sides of the retaining recess HA.

Ribs 77, in particular elastic ribs, are advantageously also provided on the clamping arms, which improve this form-fitting clamping contact of the clamping arms 73.

The retaining body 70 fundamentally has a flat shape, so that, like the support body 30, it comprises narrow sides 72 opposing one another, which are provided in particular on the outer sides of the clamping arms 73. Flat sides 74 extend between the narrow sides 72, in particular in the region of the main body 71. The retaining body 30 furthermore comprises a passage opening 76, which extends from an end side 75 facing toward the tie rod 50 or the support body 30, which is formed in the present case as a flat side, to the actuating recess 79 between the clamping arms 73. The screw section 58 can thus be inserted through the passage opening 76 and screwed into the wedge body 80. The clamping arms 73 thus spread apart.

The function of the rotary driving contours 54 and/or 55 is also clear in this context. Specifically, the operator can actuate the rotary driving contours 54, 55 using an assembly tool, for example, a hex wrench, an open end wrench, a ring wrench, or the like in order to more or less screw the tie rod 50 into the wedge body 80 and thus clamp the retaining body 70 in the retaining recess HA.

It can be seen that the longitudinal axis L of the tie rod 50 thus possibly does not align optimally with a center axis (in relation to the insertion axis S) of the insertion receptacle 26 of the buttress body 20. However, this is not problematic insofar as the insertion receptacle 26 has a transverse width which not only permits an insertion of the insertion section 52 of the tie rod 50, but rather also a transverse correction.

This is because the insertion receptacle 26 has an alignment transverse width Q, which is greater than a movement play which is necessary per se to insert the insertion section 52 into the insertion receptacle 26. This is recognizable in particular in the illustration according to FIG. 5. The insertion projection 52 of the insertion receptacle 50 can be positioned inside the insertion receptacle 26 not only in a middle position PM, but rather in lateral positions P1 or P2 deflected in relation to the middle position PM and also advantageously in numerous positions located in between.

The insertion section 52 finds an optimum contact opposite to the clamping body 60 in the insertion receptacle 26. The insertion section 52 abuts a base surface 28 of the insertion receptacle 26 with a planar contact surface 52A, which is provided, for example, by one of the outer sides of the hexagon of the polygonal rotary driving contour 54. The base surface 28 is opposite to the clamping body 60 and thus optimally supports the tie rod 50 in relation to the clamping body 60. It can furthermore be seen that the rotary driving contour 54 is in principle obstructive to a transverse adjustment and/or alignment of the tie rod 50 within the alignment transverse width Q, specifically because outer edges of the rotary driving contour 54 more or less protrude laterally in front of the contact surface 52A (see FIG. 5). To remedy this problem, the insertion receptacle 26 widens outward away from the base surface 28, so that the alignment transverse width Q is also provided in the region of the projections 52B provided by the contact surface 52A, namely the edges of the rotary driving contour 54.

The insertion receptacle 26 furthermore has a transverse height H transversely in relation to the alignment transverse width Q. The transverse height H is less than the alignment transverse width Q. The insertion receptacle 26 thus has a flat shape. The transverse height H is the clear width of the insertion receptacle 26 between the base surface 28 and at least one support surface 28A opposite to the base surface 28. The at least one support surface 28A is advantageously a planar surface. The at least one support surface 28A advantageously extends in parallel to the base surface 28. In principle, two support surfaces 28A are provided, between which the clamping body 60 is arranged.

A cover 90 is provided for the visually appealing covering of the anchoring fitting 10, in particular the buttress body 20. The cover 90 comprises, for example, a plate body 91, which essentially aligns with the workpiece flat side WF2 when the cover 90 is attached to the anchoring fitting 10. The plate body 91 comprises retaining projections 92, which can be engaged with the buttress body 20, for example, in the region of receptacles 22A. The receptacles 22A are, for example, indentations or other depressions which are provided on the long sides 22 or in the region between the long sides 22 and the end side 21. Of course, other anchors are also conceivable, for example, a variant (not shown in the illustration) having a retaining projection which can engage in the rotary driving contour 62 of the clamping body 60, for example, like an insertion projection.

Figure 6:
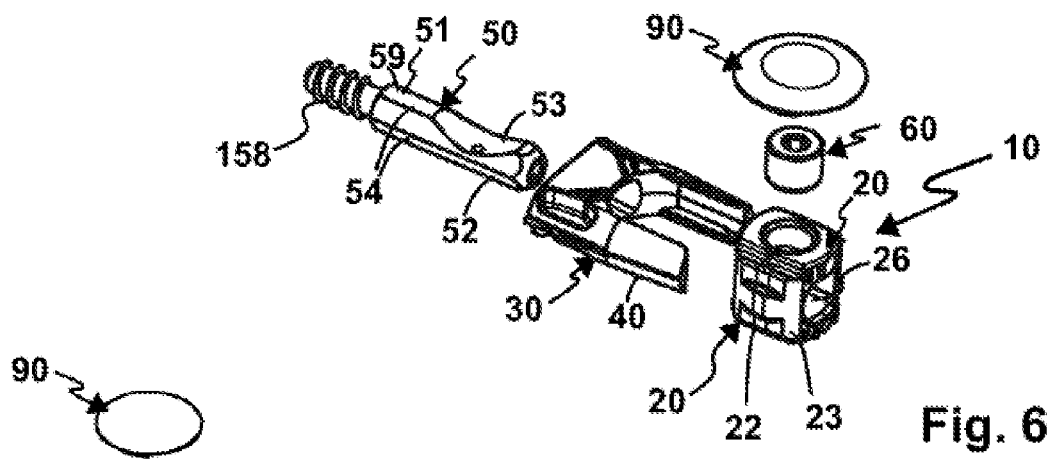
FIG. 6 shows an exploded illustration of the connecting fitting according to FIGS. 1 and 2 having an alternative tie rod.

Variants of the anchoring fitting 10 are readily possible and are indicated, for example, in FIG. 6. The tie rod 50 shown there comprises, for example, a self-tapping thread 158, using which it can be screwed directly into a workpiece, for example, into a wooden workpiece.

Figure 7:
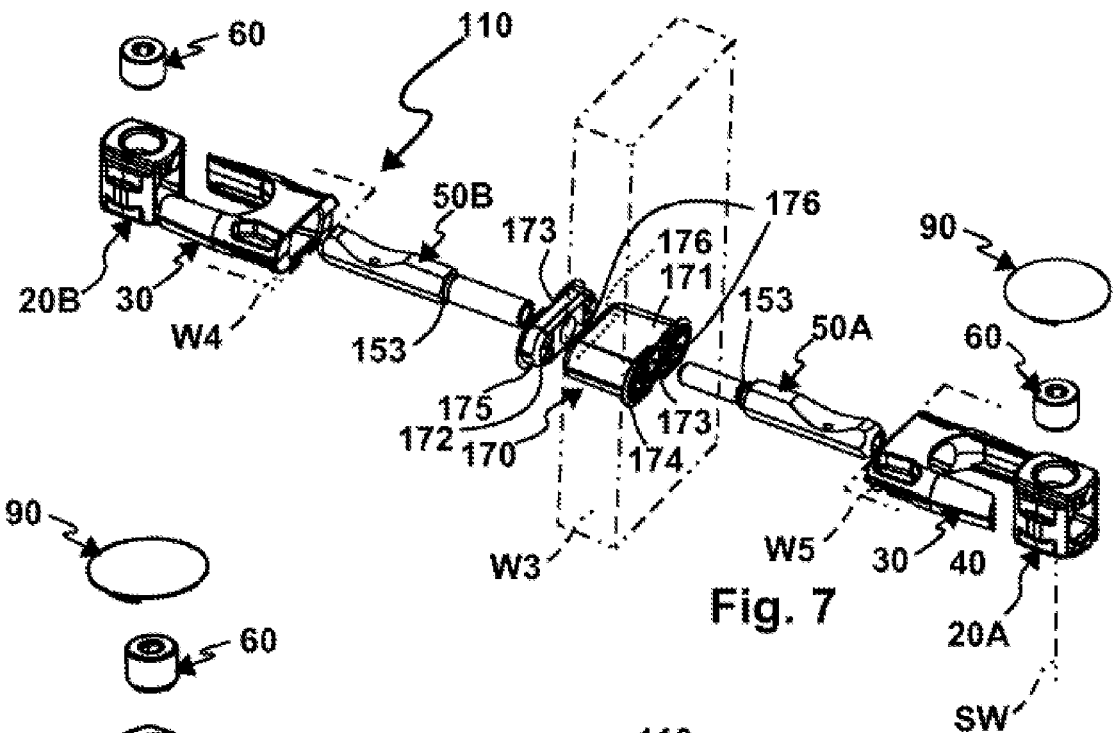
FIG. 7 shows an exploded illustration of a further connecting fitting having two tie rods, an interconnected retaining body, and two buttress bodies.
Figure 8:
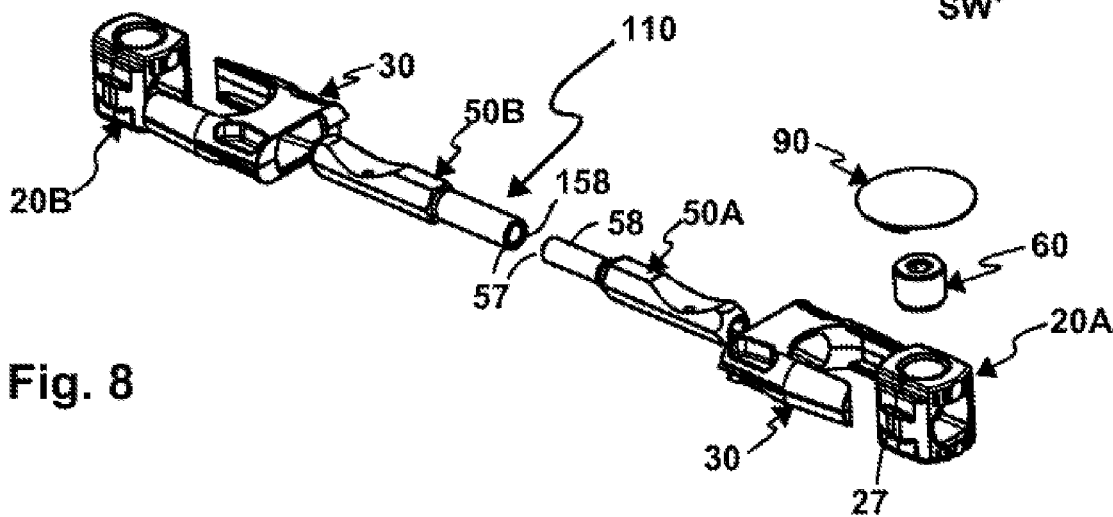
FIG. 8 shows the arrangement according to FIG. 7, but without retaining body.

A connecting fitting 110 according to FIGS. 7 and 8 can be assembled in different ways. Identical or similar components are provided with the same reference signs and are not explained in greater detail. The anchoring fitting 110 comprises, for example, buttress bodies 20A, 20B corresponding to the buttress body 20, which are to be arranged in buttress recesses (not identified in greater detail) of workpieces W4 and W5. The workpieces W4 and W5 furthermore comprise connecting recesses, into each of which a support body 30 is to be inserted, which is to be engaged with the respective buttress body 20A, 20B.

Tie rods 50A, 50B, which are similar in principle to the tie rod 50, can be brought into a clamp connection with the buttress bodies 20A, 20B. However, screw means for screwing the tie rods 50A, 50B together with one another are provided on the tie rods 50A, 50B in the region of the longitudinal ends 57. The screw means comprise, for example, the above-mentioned screw section 58, which is suitable for screwing into a screw receptacle 158 of the other tie rod 50B. They screw connection can take place directly, as indicated in FIG. 8.

However, it is also possible that a further workpiece W3 can be arranged between the workpieces W4 and W5 in a sandwiched manner, for example, a side wall of an item of furniture. The workpieces W4 and W5 are in this case, for example, shelves, top panels, or bottom panels of a cabinet.

A retaining recess similar to the retaining recess HA, into which a retaining body 170 is insertable, is provided in the workpiece W3. The retaining body 170 comprises one partial retaining body 171 and another partial retaining body 172, which are insertable one into another. The partial retaining bodies 171, 172 are inserted from opposing sides into the retaining recess of the workpiece W3. At the same time, a retaining projection 175 of the partial retaining body 171 can be inserted into an insertion receptacle 176 of the other partial retaining body 172.

On the end sides associated with outer sides of the workpiece W3, the partial retaining bodies 171, 172 have, for example, projections 174 to delimit the insertion movement into the retaining receptacle of the workpiece W3.

The tie rods 50A, 50B can be preinstalled on the partial retaining bodies 171, 172. For example, catch contours 153, for example, a catch projection, a catch receptacle, or the like are provided in the region of the step 59 of a respective tie rod 50A, 50B, which can be brought into a catch engagement with counter catch contours 173 on the partial retaining bodies 171, 172.

The retaining body 170 comprises a passage opening 176, through which the tie rods 50A, 50B, specifically in particular the screw sections 158, 58 thereof, can be inserted. A portion of the passage opening 176 is provided on each of the partial retaining bodies 171, 172.

The invention claimed is:

1. An anchoring fitting for anchoring in a workpiece, wherein the anchoring fitting comprises:
 a tie rod to be arranged in a connecting recess of the workpiece;
 a buttress body to be arranged in a buttress recess of the workpiece communicating with the connecting recess, wherein the buttress body comprises an insertion receptacle for the insertion of an insertion section of the tie rod along an insertion axis and a support surface arrangement for support on the buttress recess of the workpiece, wherein at least one support surface of the support surface arrangement extends, transversely to a longitudinal axis of the tie rod inserted into the insertion receptacle, so that the tie rod is supported with respect to its longitudinal axis on the buttress recess;
 a clamping body for clamping the insertion section of the tie rod in the insertion receptacle; and
 at least one support body having a flat shape having opposing flat sides and narrow sides, extending between the flat sides for formfitting support at least in sections in the connecting recess or the buttress recess of the workpiece,
 wherein the insertion receptacle, transversely to the insertion axis, has an alignment transverse width, which is suitable for aligning the tie rod with respect to the buttress body, and which is greater than a movement play necessary for the insertion of the tie rod into the insertion receptacle, and
 wherein the at least one support body comprises a buttress body receptacle for the buttress body, in which the buttress body engages in the assembled state of the anchoring fitting.

2. The anchoring fitting as claimed in claim 1, wherein the clamping body is adjustable with respect to the buttress body along a clamping axis, which is perpendicular to the insertion axis, wherein the alignment transverse width extends transversely to the clamping axis.

3. The anchoring fitting as claimed in claim 1, wherein the alignment transverse width is at least 5%, greater than a transverse width of the insertion section of the tie rod.

4. The anchoring fitting as claimed in claim 1, wherein the insertion receptacle has a transverse height, which is angled, to each of the alignment transverse width and the insertion axis, and the dimension of which is sufficient to insert the tie rod into the insertion receptacle, wherein the transverse height is less in relation to a height of the insertion section than the alignment transverse width is in relation to a width of the insertion section.

5. The anchoring fitting as claimed in claim 1, wherein the clamping body comprises at least one clamping inclination, on its side, facing toward the insertion section of the tie rod.

6. The anchoring fitting as claimed in claim 1, wherein the clamping body comprises a clamping screw or is formed by a clamping screw and/or comprises a screw section to be screwed into the buttress body.

7. The anchoring fitting as claimed in claim 1, wherein the clamping body is opposite to a base surface of the insertion receptacle, and/or wherein the insertion receptacle comprises a base surface provided for the contact of the insertion section of the tie rod.

8. The anchoring fitting as claimed in claim 7, wherein the base surface and/or a contact surface of the insertion section of the tie rod for contact on the base surface is a planar surface or flat surface.

9. The anchoring fitting as claimed in claim 7, wherein the insertion receptacle is wider than the base surface in a region between the clamping body and the base surface to provide an alignment transverse width, and/or wherein the insertion receptacle comprises a support surface, which is opposite to the base surface and is formed as a planar surface.

10. The anchoring fitting as claimed in claim 7, wherein the insertion receptacle comprises side wall surfaces, extending diagonally outward from the base surface.

11. The anchoring fitting as claimed in claim 1, wherein the insertion section of the tie rod comprises a contact surface for contact on a base surface of the insertion receptacle and comprises at least one projection protruding in a plane parallel to the contact surface, which projection protrudes in front of the contact surface in the direction of the alignment transverse width.

12. The anchoring fitting as claimed in claim 1, wherein the support surface arrangement of the buttress body comprises at least two support surfaces, which are provided on opposing sides and are provided for the support transversely, to the longitudinal axis of the tie rod on the buttress recess.

13. The anchoring fitting as claimed in claim 1, wherein the support surface arrangement of the buttress body comprises at least one support rib and/or a rib structure to engage in a workpiece in the region of the buttress recess.

14. The anchoring fitting as claimed in claim 1, wherein the buttress body receptacle is provided between forked protruding arms of the support body.

15. The anchoring fitting as claimed in claim 14, wherein a linear guide for inserting the buttress body into the buttress body receptacle is provided on at least one arm of the support body, wherein the buttress body comprises guide contours matching with the linear guide.

16. The anchoring fitting as claimed in claim 1, wherein twist-lock contours for the twist-locked accommodation of the buttress body in the buttress body receptacle are provided on the buttress body receptacle and/or the buttress body.

17. The anchoring fitting as claimed in claim 1, wherein the buttress body receptacle is arranged on at least one flat side or extends between the flat sides of the support body, and/or wherein the buttress body protrudes from the support body on at least one side, in the state assembled on the support body.

18. The anchoring fitting as claimed in claim 1, wherein the support body comprises a passage opening for the tie rod, wherein the passage opening has a transverse width enabling an alignment of the tie rod in the insertion receptacle at least in the region of the buttress body, which width is equal to or greater than the alignment transverse width of the insertion receptacle of the buttress body.

19. The anchoring fitting as claimed in claim 1, wherein the at least one support body provides or is formed as a support body to be arranged in the connecting recess.

20. The anchoring fitting as claimed in claim 1, wherein the tie rod comprises at least one rotary driving contour for an assembly tool.

21. The anchoring fitting as claimed in claim 20, wherein the rotary driving contour is arranged on an outer circumference of the tie rod in the region of the insertion section.

22. The anchoring fitting as claimed in claim 1, wherein the tie rod comprises a screw section to be screwed into an anchoring body, wherein the screw section and the insertion section are arranged on opposing longitudinal end regions of the tie rod.

23. The anchoring fitting as claimed in claim 1, further comprising an inclined surface arrangement between the tie rod and the clamping body for the longitudinal adjustment of the tie rod with respect to the buttress body in the direction of the longitudinal axis of the tie rod.

24. The anchoring fitting as claimed in claim 23, wherein the inclined surface arrangement comprises at least one positioning inclination, extending obliquely to the longitudinal axis of the tie rod.

25. The anchoring fitting as claimed in claim 23, wherein the inclined surface arrangement extends transversely to the longitudinal axis of the tie rod with a transverse width, which enables an alignment of the tie rod with respect to the buttress body in the region of the alignment transverse width of the insertion receptacle.

26. The anchoring fitting as claimed in claim 1, wherein the buttress body is provided for anchoring the anchoring fitting in a first workpiece and the anchoring fitting comprises at least one retaining body for fastening in a retaining recess of a second workpiece, wherein the retaining body is connected to the tie rod and/or fastening means, are provided on the tie rod and the retaining body for the detachable fastening of the tie rod on the retaining body and/or the retaining body comprises a passage opening for at least one portion of the tie rod.

27. The anchoring fitting as claimed in claim 26, wherein the retaining body has a flat shape having flat sides opposite to one another and narrow sides extending between the flat sides for the formfitting support at least in sections in the retaining recess and/or is in multiple parts.

28. The anchoring fitting as claimed in claim 26, wherein the retaining body comprises or forms a clamping body for clamping in the retaining recess of the second workpiece.

29. The anchoring fitting as claimed in claim 26, wherein the retaining body comprises at least one clamping arm, for clamping in the retaining recess of the second workpiece, wherein the at least one clamping arm is adjustable by the tie rod or a wedge body actuatable by the tie rod in a clamped position clamping the retaining body in the retaining recess.

30. The anchoring fitting as claimed in claim 1, wherein the maximum outer circumference and/or an envelope of the buttress body around its insertion axis provided for insertion into the buttress recess is approximately circular, so that the buttress body is insertable into the buttress recess if it has a circular inner contour.

31. An anchoring fitting for anchoring in a workpiece, wherein the anchoring fitting comprises:
   a tie rod to be arranged in a connecting recess of the workpiece;
   a buttress body to be arranged in a buttress recess of the workpiece communicating with the connecting recess, wherein the buttress body comprises an insertion receptacle for the insertion of an insertion section of the tie rod along an insertion axis and a support surface arrangement for support on the buttress recess of the workpiece, wherein at least one support surface of the support surface arrangement extends, transversely to a longitudinal axis of the tie rod inserted into the insertion receptacle, so that the tie rod is supported with respect to its longitudinal axis on the buttress recess;
   a clamping body for clamping the insertion section of the tie rod in the insertion receptacle; and
   at least one support body having a flat shape having opposing flat sides and narrow sides, extending between the flat sides for formfitting support at least in sections in the connecting recess or the buttress recess of the workpiece,
   wherein the insertion receptacle, transversely to the insertion axis, has an alignment transverse width, which is suitable for aligning the tie rod with respect to the buttress body, and which is greater than a movement play necessary for the insertion of the tie rod into the insertion receptacle, and
   wherein the alignment transverse width is at least 5%, greater than a transverse width of the insertion section of the tie rod, and
   wherein the at least one support body comprises a buttress body receptacle for the buttress body, in which the buttress body engages in the assembled state of the anchoring fitting.

* * * * *